United States Patent [19]
Sanvitale

[11] Patent Number: 5,104,666
[45] Date of Patent: Apr. 14, 1992

[54] SINGLE-DOSE ESPRESSO MAKER FOR INFUSIONS IN GENERAL TO BE DISPOSED AFTER USE

[75] Inventor: Salvatore Sanvitale, Trento, Italy

[73] Assignee: Brevetti Sanvitale S.r.l., Trento, Italy

[21] Appl. No.: 687,761

[22] Filed: Apr. 18, 1991

Related U.S. Application Data

[63] Continuation-in-part of Ser. No. 355,437, May 22, 1989, abandoned.

[30] Foreign Application Priority Data

Jun. 2, 1988 [IT] Italy .............................. 82205 A/88
Jul. 18, 1988 [IT] Italy .............................. 82210 A/88

[51] Int. Cl.$^5$ .............................................. A47J 31/24
[52] U.S. Cl. .......................................... 426/77; 426/109; 426/112; 426/433; 99/295; 99/303
[58] Field of Search ............... 426/112, 77, 433, 241, 426/243; 99/292, 293, 295, 298, 300, 301, 302 R, 303, 316, 317

[56] References Cited

U.S. PATENT DOCUMENTS

| 2,685,248 | 8/1954 | Ohlsson | 99/303 |
|---|---|---|---|
| 3,077,156 | 2/1963 | Egi et al. | 99/303 |
| 3,193,388 | 7/1965 | Conrey | 426/80 |
| 3,336,857 | 8/1967 | Knodt et al. | 99/295 |
| 3,368,476 | 2/1968 | Mancioli | 99/303 |
| 3,413,910 | 12/1968 | Sanvitale | 99/303 |
| 3,589,272 | 6/1971 | Bouladon | 426/77 |
| 3,670,641 | 6/1972 | Mancioli | 99/293 |
| 3,757,670 | 9/1973 | Laama et al. | 99/302 R |
| 4,136,202 | 1/1979 | Favre | 426/77 |
| 4,167,899 | 9/1979 | McCormick | 426/112 |
| 4,386,109 | 5/1983 | Bowen et al. | 426/241 |
| 4,479,421 | 10/1984 | Sanvitale | 99/293 |
| 4,498,375 | 2/1985 | Bedini | 99/303 |

FOREIGN PATENT DOCUMENTS

| 112086 | 6/1984 | European Pat. Off. |  |
|---|---|---|---|
| 545824 | 1/1922 | France | 99/303 |
| 1208904 | 11/1958 | France |  |
| 1235252 | 9/1959 | France | 99/303 |
| 642090 | 7/1962 | Italy | 99/292 |
| 976601 | 12/1964 | United Kingdom | 99/292 |

*Primary Examiner*—Steven Weinstein
*Attorney, Agent, or Firm*—Collard, Roe & Galgano

[57] ABSTRACT

The present invention consists of a single-dose espresso maker for preparing infusions in general, to be disposed of after being used. It consists of two glass-shaped containers, one of which contains water to be heated and the other of which, equipped with a filtering bottom wall, contains the infusion product; the mutually opposite mouths of both said containers are coupled with each other by grafting, with the interposition of a water-sealing disk-shaped element of pre-established strength, which can be broken by the pressure developed by heating water; and of at least one perforated disk-shaped element. After heating the water containing element, the pressure of generated water vapor causes the breakage of said sealing disk, enabling water to flow through the filter-container containing the infusion product and hence the desired infusion to be produced and fed to a container associated with the espresso maker.

4 Claims, 6 Drawing Sheets

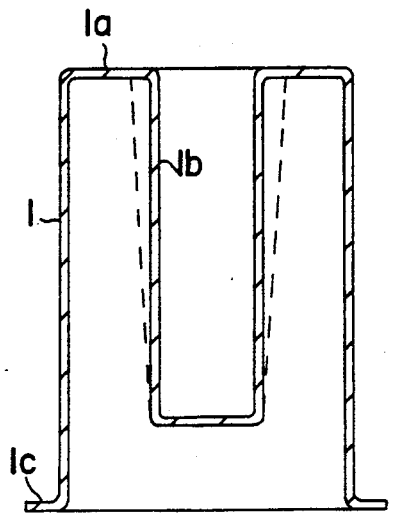
FIG.1
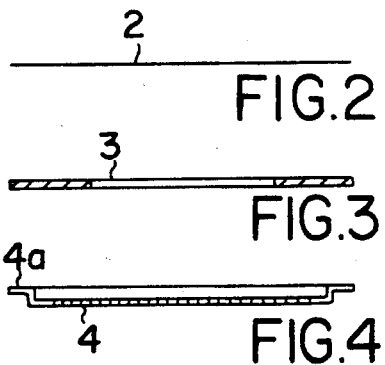
FIG.2
FIG.3
FIG.4
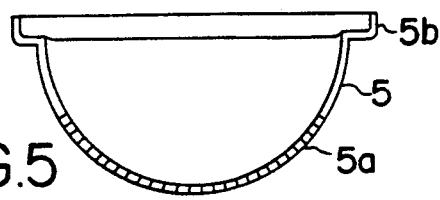
FIG.5
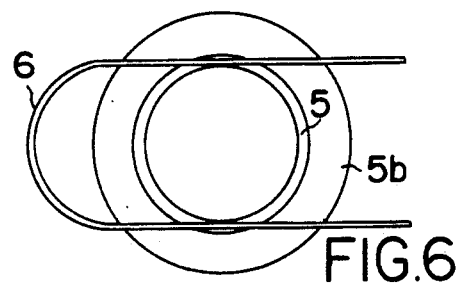
FIG.6
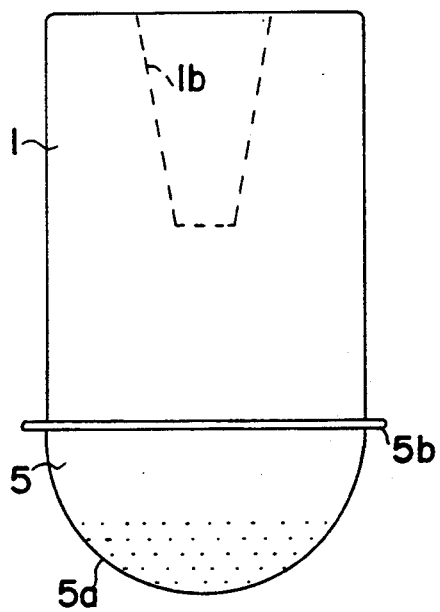
FIG.8
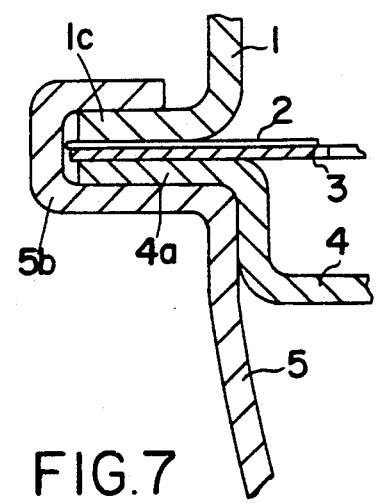
FIG.7

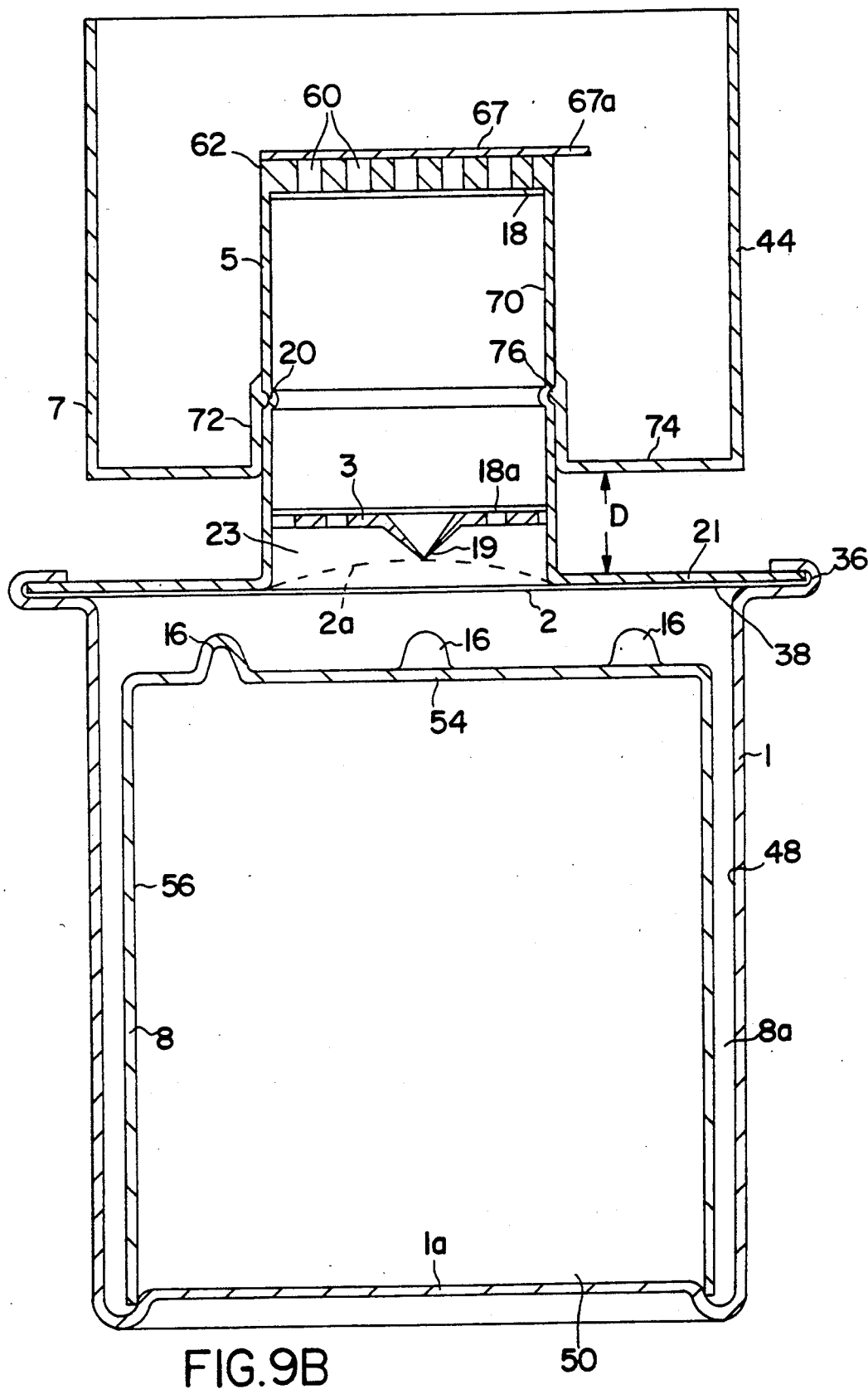

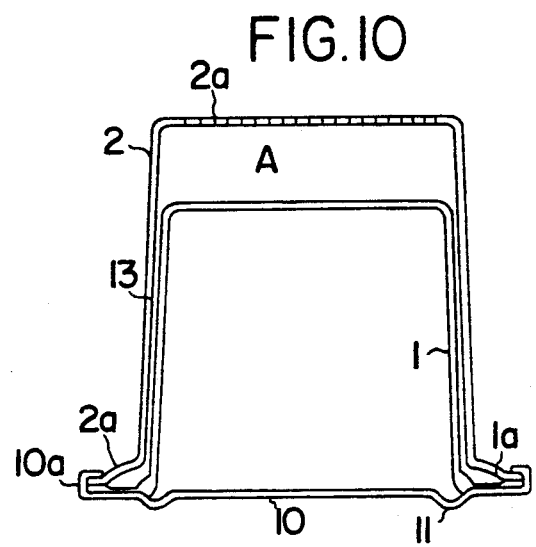
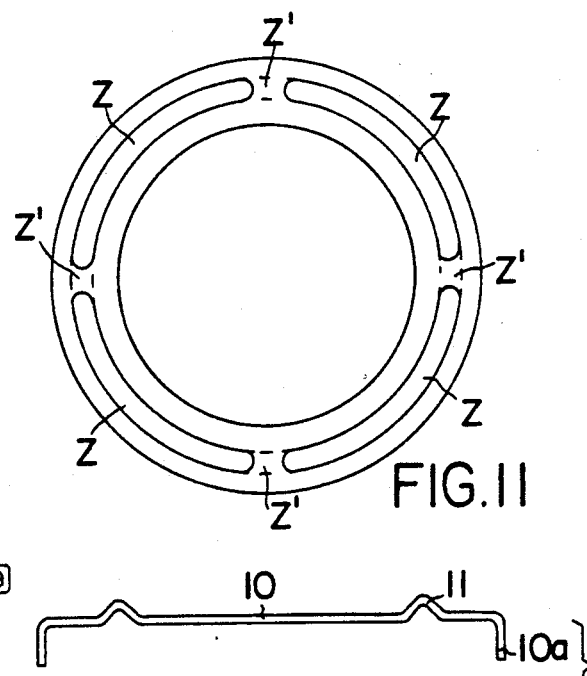
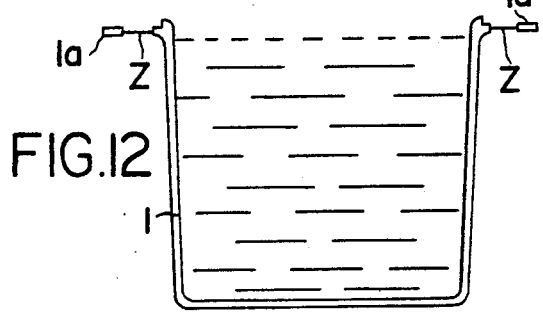
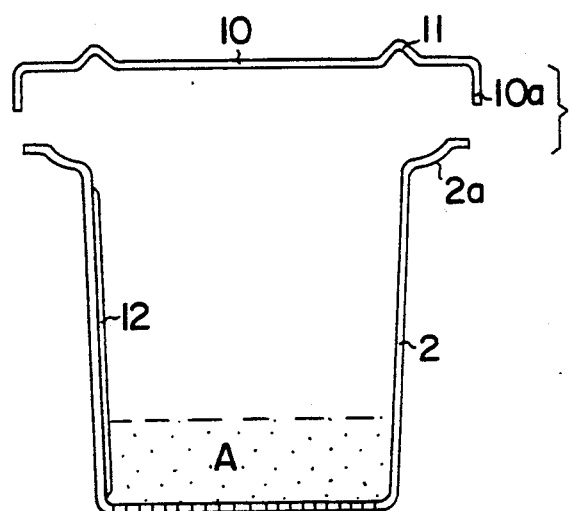
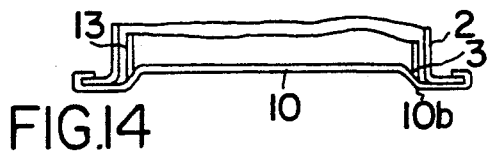
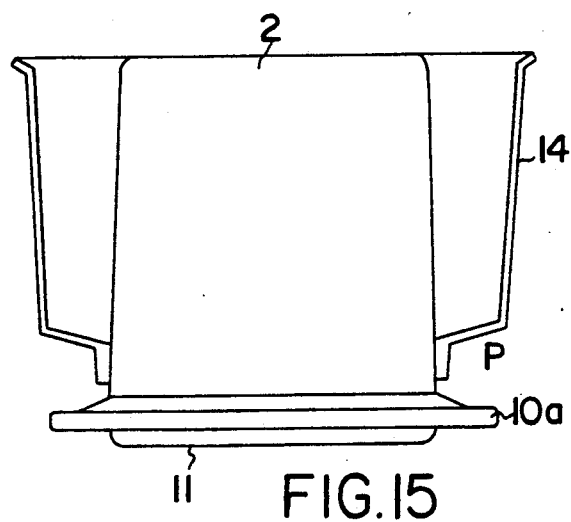

SINGLE-DOSE ESPRESSO MAKER FOR INFUSIONS IN GENERAL TO BE DISPOSED AFTER USE

This is a continuation-in-part of copending application Ser. No. 07/355,437 filed on May 22, 1989, now abandoned.

DESCRIPTION

The present invention relates to a single-dose espresso maker for preparing various kinds of infusions, such as coffee, tea, camomile tea, and the like, prearranged as a cartridge containing all of the necessary components, to be disposed of after use.

It is well known that the espresso makers for one or two coffee cups, normally for household use, are constituted by a water container, a cup-filter to be filled with ground coffee and by a container with a perforated bottom wall to be coupled, by screwing down, with the underlying water container, with the interposition of a sealing gasket.

These types of espresso makers, obviously re-useable many times, besides being limited to the production of coffee infusions, suffer, in practice, from the drawback of requiring water to be charged, the dose of ground coffee to be charged to the filter and a source of heat, such as a gas flame, an electrical heater, or the like, to be available each time that the espresso maker has to be used. These operations have all to be carried out carefully, above all as regards the metering of water and of ground coffee, in order to obtain an infusion having the desired characteristics of flavour and taste. Furthermore, inasmuch as the pressure, and therefore the temperature under which the water flows through the coffee blend cannot be controlled, not always adequately exhausting the product from which the infusion is made is possible, in that, in some cases, the water flows along preferential paths through the same product, with the density and the flavour of the obtained infusion being consequently reduced.

It is known as well that the present re-chargeable espresso makers, precisely due to the fact that they operate at uncontrollable pressure and temperatures, do not enable the user to use them in order to obtain either infusions different from coffee infusions, or particular types of beverages, such as, e.g., beverages with milk, flavours, and the like.

A purpose of the present invention is of providing a single-dose espresso maker as a sealed cartridge, so conceived as to make it possible different types of infusions either with water or with other liquids to be prepared as required, which espresso maker is suitable for being disposed of after use.

Another purpose of the present invention is of providing an "use-and-throw-away" espresso maker, having such a structure as to enable the usere to adjust water pressure, according to the types of infusions to be obtained, at the most suitable values in order to obtain the best exhaustion to be obtained of the infusion material in powder form, without same water establishing preferential passage paths.

A further purpose of the present invention is of providing a single-dose espresso maker which essentially is an enbloc device, easy to be used, highly reliable, and also equipped with its own standalone heat source.

Not a least purpose is of providing an espresso maker so conceived as to secure a perfect preservation over time of the product from which the infusion has to be made, to make it possible liquids different from water to be used, and to practically result cheap and manufacturable from both metal material and high-temperature-resistant plastic materials.

These and still further purposes, which will be clearer from the following, are practically achieved by a single-dose espresso maker for producing infusions in general, and useable once only, which is constituted, according to the present invention, by at least two container bodies, one of which, substantially having the shape of a glass destined to contain the water to be heatd in order to prepare the infusion, and the other of which substantially has the shape of a filter-container destined to contain a dose of product from which the infusion has to be made, such as coffee, tea, camomile flower, and the like, corresponding to one cup of infusion, with the mouths of said containers being coupled with each other along their respective peripheral edges and tightly seated with the interposition of a disk-shaped element having a pre-established mechanical strength in order to keep water tightly confined and separated from the product from which the infusion has to be made, and of at least one disk-shaped element provided with one or more more holes, so as to enable, after the water container being heated, the pressure developed by the same water to break said disk-shaped sealing element, making it possible water to flow through the dose of product from which the infusion has to be made, and hence the infusion to be produced and fed to a cup, or the like.

More particularly, according to a first form of practical embodiment of the present invention, said two container bodies are coupled with each other in a mutually opposite position, with the water container being positioned above the filter-container element containing the infusion product, and therefore with the movement of water taking place from up downwards, in the body of said water container a large housing being provided in order to house a heat source, for instance of the chemical-reaction type.

According to another form of practical embodiment of the present invention, said two container bodies are positioned in a mutually opposite position, with the water container being positioned under the container containing the product from which the infusion has to be made, with the inside the water container a bell-shaped element being housed, having such dimensions as to define an annular hollow space with the wall of the external container, so as to make it possible the bell-shaped element to move upwards from the bottom of the same container when the container of water is heated, under the thrust applied by water pressure, and water to be forced to flow upwards through said hollow space and then flow through the product from which the infusion has to be made, which infusion, leaving the espresso maker from the upper side of said espresso maker, is collected inside a container coaxially anchored, either stably or with possibility or removal, to the same container of the product from which the infusion has to be made.

BRIEF DESCRIPTION OF THE DRAWINGS

The present finding is disclosed in greater detail in the following according to some forms of practical embodiment thereof with reference to the hereto attached drawing figures, given for merely illustrative and non-limiting purpose, in which:

FIG. 1 shows an upside-down glass container, constituting a component of the disposable espresso maker according to the present invention;

Figure 9:
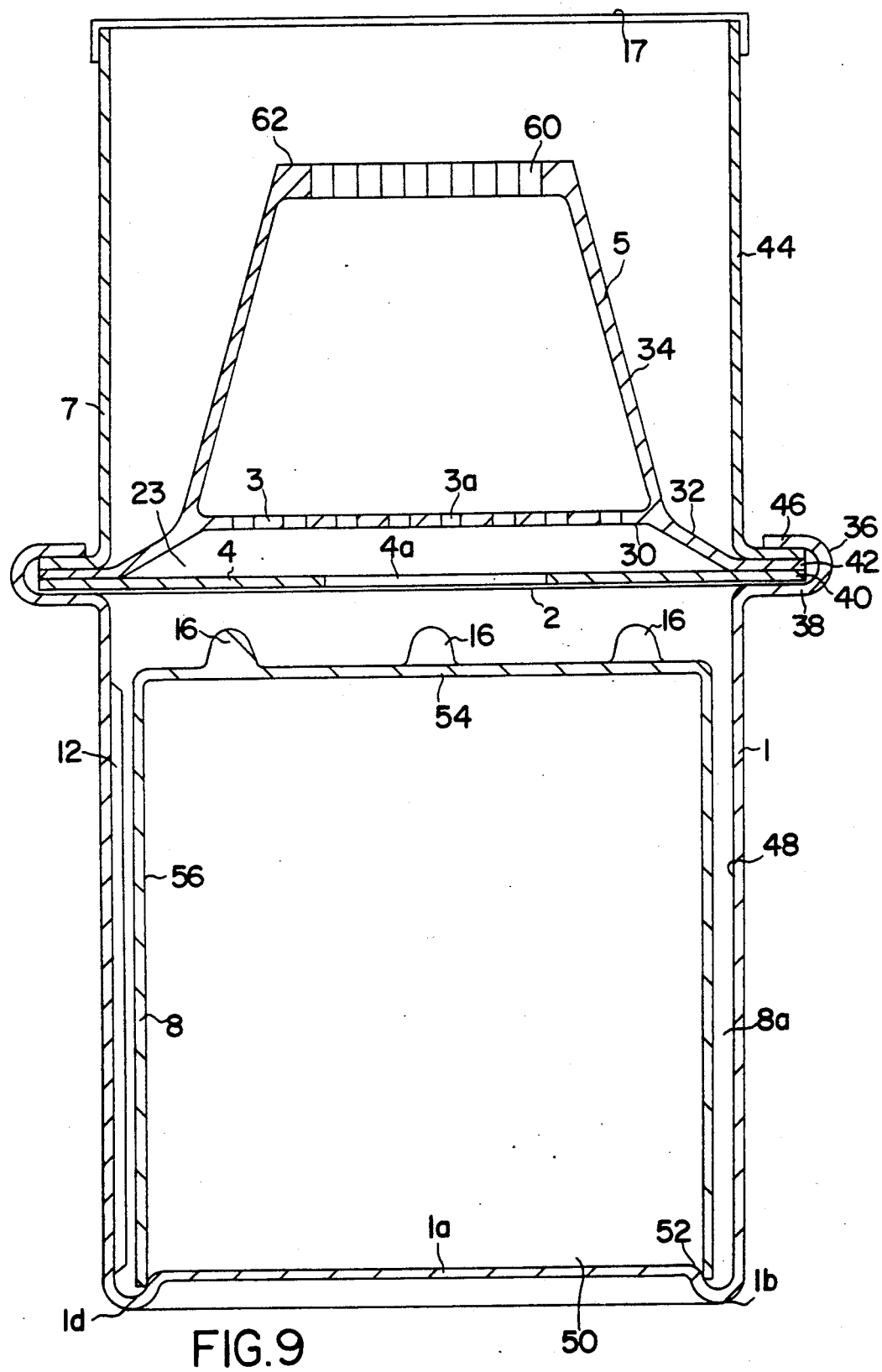
Figure 9A:
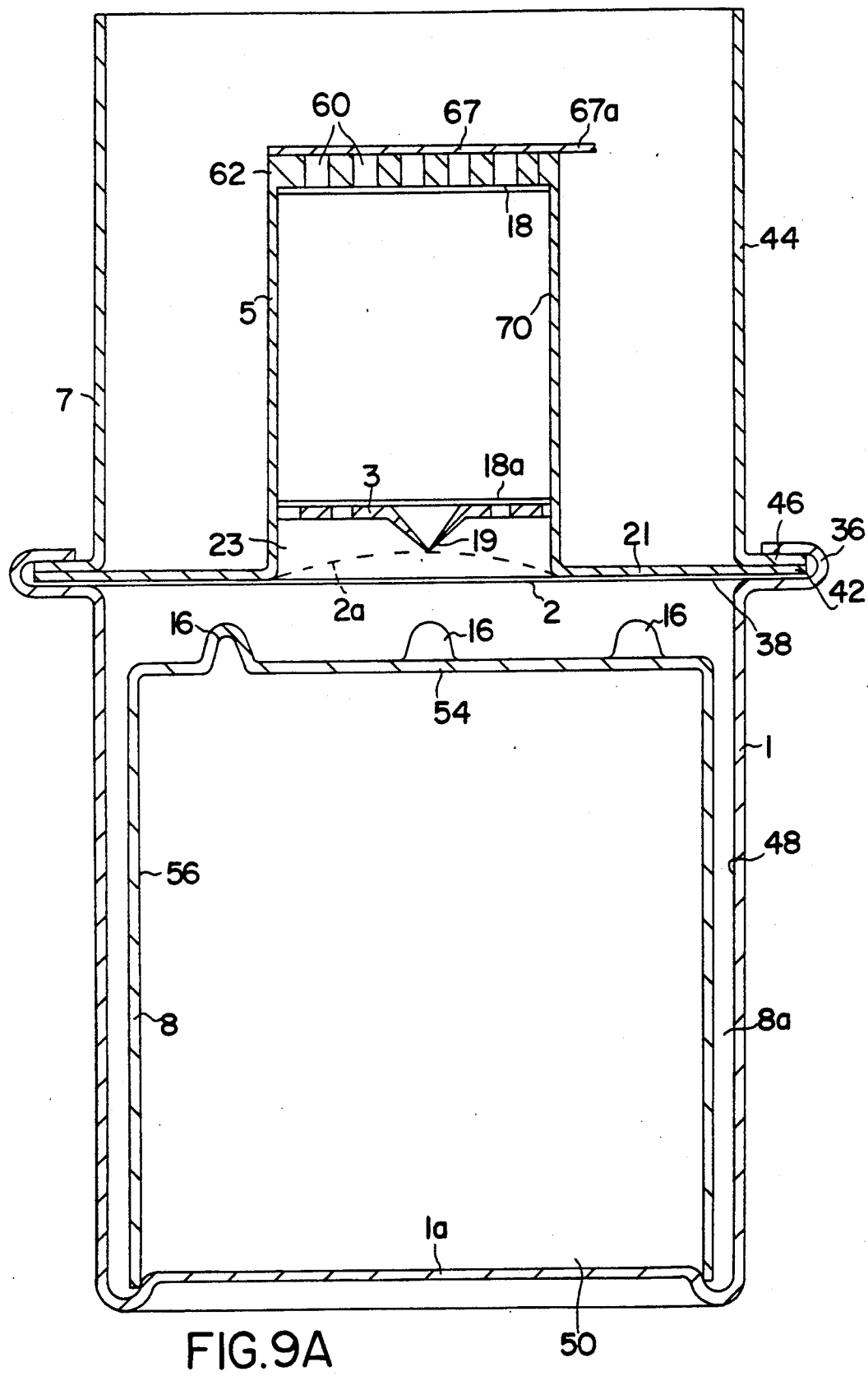
Figure 16:
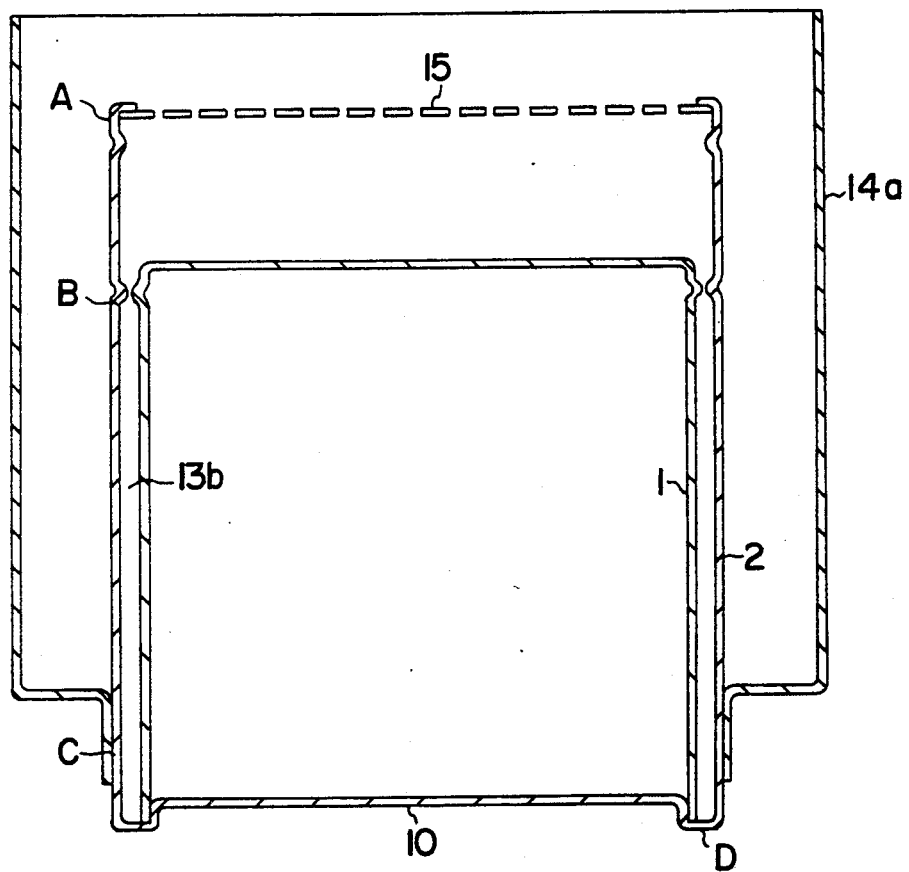

FIGS. from 2 to 4 show separate side views of the disk-shaped filtering elements of the coffee maker according to the present invention;

FIG. 5 shows the container of the product from which the infusion has to be made, suitable for being coupled with the elements of above FIGS. from 1 to 4;

FIG. 6 shows a support element associated with the espresso maker according to the previous figures;

FIG. 7 shows a portion of peripheral grafting suitable for connecting, under tightly sealed conditions, all of the elements of the espresso maker;

FIG. 8 shows the finished cartridge-shaped espresso maker ready for use, accomplished according to a first form of practical embodiment;

FIG. 9 shows a side view of a second form of practical embodiment of a disposable espresso maker, accomplished according to the present finding;

FIG. 9A shows a modification of the embodiment illustrated in FIG. 9 for the disposable espresso maker of the invention;

FIG. 9B shows a further additional modification of the disposable espresso maker illustrated in FIG. 9;

FIG. 10 shows a further form of practical embodiment of an espresso maker, also according to the present invention;

FIG. 11 shows a bottom plan view, i.e., from the side of the mouth of the container according to FIG. 10;

FIGS. 12, 13, 14 respectively show the three components separate from each other and the region of coupling by grafting of the same elements which constitute the espresso maker according to FIG. 10;

FIG. 15 shows a side elevation view of the complete espresso maker, obtained with the elements of the FIGS. from 12 to 14, and FIG. 16 shows a side elevation view of an espresso maker partially modified as compared to the espresso maker of FIGS. 10 and 15.

Referring to the above figures, and in particular to FIGS. from 1 to 8, the disposable ("use-and-throw-away") espresso maker according to the present invention, as depicted, ready for use, in FIG. 8, is constituted by a container 1 made from metal or from another, high-temerpature-resistant material, substantially having the shape of an upside-down glass, on whose bottom wall 1a a housing 1b of either cylindrical or conical shape is provided, designed to house a heat source, e.g., an exothermic-reaction chemical compound, an electrical resistor, or the like. Of course, such a heat source can be provided also all around said water container, or also in housings provided on the sides, or the like. The mouth of the container 1 is provided with a peripheral edge 1c having such dimensions as to be then capable, during the assembling step, of being "grafted" by the piece shown in FIG. 5.

With the container 1, the following can be furthermore associated: a disk of very thin metal 2 (e.g., an aluminum foil), similar to the usual silver paper, the thickness of which, as we'll see in the following, shall be suitably selected; a second metal disk 3 (e.g., of aluminum), provided with one or more holes 3a, with the number, the shape and the total surface area of said hole(s) being such as to be capable together with the thickness of the thin disk 2, of causing the whole device to operate correctly; and a third metal disk 4 (e.g., of aluminum), perforated in a way similar to the perforations of the filters of the usual espresso makers available on the market; its perforated portion being anyway slightly spaced (at a distance of about 2, 3 or 4 mm) from its edge 4a, in that (as we'll see in the following) water, by flowing downwards through one or more holes of the disk 3, after breaking at one or more point(s) the silver paper which constitutes the disk 2, should continue to flow downwards with a pressure which is the same throughout the circular surface, in order to make it possible the product from which the infusion has to be made to be better exhausted, without preferential flow paths being determined.

The espresso maker contains a furthermore a container 5 having a shape e.g. semispherical, perforated like the filter of the usual coffee makers available from the market, but only in its dashed portion 5a (see FIG. 5), which will contain the material used for preparing the infusion (ground coffee, tea leaves, and so forth). The espresso maker is assembled by grafting with the peripheral edge 5b of the container 5 the peripheral edges of all of the four further elements, according to the order as shown in FIG. 7. Obviously, the grafting can be also accomplished by using the peripheral edge of the container 1, suitably modified, which in that case will be the one which grafts the other components.

More precisely, as shown in FIG. 7, from up downwards assembled are: the container 1, which contains water; the thin sheet of silver paper 2; the disk 3 with large, or variously shaped, one or more holes 3a; the disk 4, with normal holes.

The edge of the filter-container 5, by grafting all of the four elements, secures the tight water sealing. The device operates as follows: after introducing the heat source into the purposely provided housing 1b, of either cylindrical or conical shape (which heat source can be either an electrical resistor or a chemical reaction), water is heated and generates water vapour. When the pressure of this latter reaches a certain value (which is determined by the thickness of the disk of silver paper 2 with relation to the shape, the number, and the surface area of the holes of the disk 3), the silver paper will be torn at one or more points, and water will flow downwards invading the chamber between the disks 3 and 4 and then will pass through the holes of the filter 4, with a same pressure throughout the circular surface even in case the silver paper was torn at one point only; water will then flood the material for the infusion contained inside the container 5, will extract the soluble portions thereof and will fall into the container which will have been placed under the cartridge-shaped espresso maker, causing the flood edge 5b to rest on an extremely simple "U"-shaped support 6 made from a metal wire, as schematically shown in FIG. 6, or in a whatever else way.

FIG. 8 shows the outer outline of the finished cartridge.

The cartridge-shaped espresso maker disclosed hereinabove offers the practical advantage that the pressure of water, and hence its temperature, can be controlled by suitably varying the thickness of the disk-shaped, tight-sealing element 2, as well as the diameter of the hole or holes 3a of the disk 3; by changing these parameters, which substantially regulate also the time required to produce the infusion, several types of infusions can be accomplished; for instance, coffee, which requires more severe temperature conditions, tea, which, on the contrary, requires milder thermal conditions, and still other beverages.

Therefore, with a pre-established set of disks 2 and 3, the manufacturer of the cartridges can pack and deliver a wide range of infusions, by practically using just one type of cartridge. Furthermore, water can be replaced by milk, sugared water or water containing additives and/or correcting agents, so that various types of beverages can be obtained without the infusion products having to be handled, and without the risk that the holes of the filtering elements may get closed up.

According to a different form of practical embodiment, also according to the present finding, the espresso maker in the form of a sealed cartridge can be so accomplished, as to be suitable for being used in upside-down position as compared to that disclosed and illustrated in FIGS. from 1 to 8.

In fact, by placing the container of water 1 at the bottom (see FIG. 9), with its bottom wall 1a being slightly sunken, so as to generate a continuous edge 1b (or with said edge being provided with separate peduncles), in order to keep the container stably resting on a heating plate (e.g., a gas-fed, or an electrical heating plate, or the like), and coupling with its upper mouth a filter-container 5 for the infusion product, with the interposition of a disk-shaped element 4 provided with one or more large hole(s) 4a and, above this latter, of a perforated metal disk 3, cartridge can be provided, which is capable of producing the infusion in the top portion of the cartridge, and of collecting it inside a container 7 positioned coaxially with the same cartridge. Also in this case, the various elements are grafted with one another along their peripheral edge, as in the preceding case. The cup 7 has a protective removable cover 17.

This cartridge is furthermore provided, in order to enable heated water to flow upwards and pass through the product enclosed inside the filter-container 5, with a cylinderical bell-shaped element 8 coaxially inserted inside the container 1, and having such dimensions of height and diameter, as to create a cylindrical hollow space 8a between the same bell and the inner wall of the container 1, which is suitable for enabling heated water to flow from the container 1 to the filter disks, and then into the filter-container 5.

This particular form of practical embodiment constitutes a cartridge in which water, by being heated, and generating water vapour inside the same bell, will enable said vapour to lift the same bell, detaching it from the bottom of the container 1, thus pushing same water to rise inside the hollow space 8a, up to flow through the filters 3 and 4, and then through the infusion product; three small protrusions (e.g. of 1 mm) at a mutual distance of 120° provided onto the bottom of the bell-shaped element will enable the water to flow even when the bell is raised. The infusion is then collected inside the container 7, also grafted to the other elements.

Also this type of cartridge, after producing the infusion, is disposed of, together with the container 7.

FIGS. 9, 9A and 9B relate to a single-dose espresso maker constituted by two container bodies, the first of which 5 has the shape of a filter container containing a dose of the product for the infusion while the second 1 contains the water to be heated, through its bottom wall 1a. The mouths of the first and second containers are coupled with each other along their respective peripheral edges. The first and second containers are tightly sealed with the inter-position of a disk-shaped element 2 having a pre-established mechanical strength in order to keep water tightly confined and separated from the product from which the infusion is to be made. There is a second disk-shaped separator element 4 provided with one or more holes 4a, so as to enable, after the water container has been heated, the pressure developed by the same water to break the disk-shaped sealing element 2. This makes it possible for water to flow through the dose of product from which the infusion is to be made, and hence the infusion can be produced and fed to a cup 7, or the like.

The thickness of the disk-shaped sealing element 2 can be suitably selected at a pre-established mechanical strength so that after heating the water, that the pressure developed by the water vapor will break the disk element. This will cause the water to flow through the product at a pressure which is the same throughout the circular surface, in order to make it possible for the product to be better exhausted, without preferential flow paths being determined. The espresso maker according to the present invention has the advantage that the pressure of the water, and hence its temperature, can be controlled by varying the thickness of the disk-shaped element 2 and the diameter of the holes 4a. Thus, by changing these particular parameters, a wide range of different types of infusions can be accomplished by using practically just one type of cartridge.

The mouth 30 of said first filter-container 5 is constituted, as it is apparent from FIG. 9, by the enlarged edge 32 protruding from the conical wall 34 of same container, and is coupled with the bent edge 36 of the second container 1. The sealing disk-shaped element of pre-established mechanical strength 2 is placed between the container 1 containing the water and the disk-shaped separator element 4 provided with holes, adhering to this last element. Sealing disk element 2 has outer edge 38, separator element 4 has outer edge 40; enlarged edge 32 has outer edge 42; and cup 7 has vertical wall 44 with outer edge 46. Thus, bent edge 36 is crimped over and around edges 38, 40, 42 and 46 to tightly join them together.

Inside the water container 1, a peripheral bell-shaped element 8 is coaxially housed, suitable for defining an annular hollow space 8a with the internal wall 48 of the container 1. The bell-shaped element 8 is suitable for being lifted under the thrust applied by the vapor generated by the heated water. This will enable the water to flow upwardly through the hollow space 8a, and to flow through the product. The infusion will then be expelled and collected inside a container 7 coaxially anchored, either stably or with the possibility of removal.

Three small protrusions 16 are located at a spaced apart mutual distance of 120°, and are provided on the bottom of the bell-shaped element. This will enable the water to flow even when the bell is raised and contacts sealing element 2. Furthermore, the bell-shaped element is guided inside the water container 1 by vertical ribs 12 provided on the inner wall 48 of the container 1.

The liftable bell element 8 can be anchored to the bottom of the water container 1 by means of a forcing of its open end 50 against ring-shaped reliefs or sloping grooves 52 provided on the bottom 1a of the container. Unlocking or dislodging of the bell element 8 is caused by the steam pressure generated by heating the water. In this case, the water is kept confined into the bell-shaped element for additional safety purposes against leakage of the water due to an accidental push, or dropping of the device.

It has to be pointed out that the coupling of the liftable bell element 8 with the bottom of the water container 1 could also be realized very easily with the help of any sealing/sticking element of the type used in food packaging.

In this case the "opening pressure" would be much more reliable; without any risk that accidentally it could reach dangerous values.

The correct operation of the espresso maker relies on the following factors, such as pressure, temperature, time of infusion, speed of the water flow-rate through the material for the infusion, resistance of this material to the passage of the water, before, during and at the end of the infusion, etc. The espresso maker of the invention has a high efficiency and precision which is reproducible time and time again, and can be maintained for a long time a rapid rate of production which might reach several thousands units per hour.

The horizontal wall 54 across the top of the bell-shaped element is impervious and continuous, so as to move upwards under the thrust applied by water pressure when the container of the water is heated.

The infusion-collection container or cup 7 is open across its top; it has only a protective removable cover 17 for storage purposes, as shown in FIG. 9.

The water is initially located in the second container 1, and is preferably kept confined in the bell-shaped element 8 which can be initially anchored to the bottom 1a of the container 1. The cylindrical hollow space 8a between the outer cylindrical wall 56 of the bell element and the inner wall 48 of the container 1, is suitable for enabling heated water to flow upwards through a peripheral hollow space preventing the water from flowing along preferential paths, leaving zones of product in container 5 not sufficiently exhausted by insufficient contact with the water.

The space 23 between the perforated metal disk 3, forming the bottom of the container 5, and the disk element 4 with holes, is provided in order to leave room enough for the tearing of the sealing disk element and for the passage of water and for the distribution of the water all over the bottom 3 of the container 5 containing the product.

In FIG. 9, the sealing disk-shaped element of pre-established mechanical strength 2, the protective removable cover 17, the small protrusions 16 and the vertical ribs 12 are illustrated.

Referring to FIG. 9, the method of operation of the device is as follows:

The device is placed on a heating plate and the water confined in the container 1, and confined in the bell element 8 is heated such that water vapor is produced.

The water vapor generated inside the bell element generates a pressure which lifts this bell upwardly, detaching it from the bottom of the container 1, causing the water to rise within the hollow space 8a. The force of the water will tear the sealing element 2 in a location corresponding to the hole 4a of the disk element 4.

The heated water then flows through the hole 4a, and through perforation 3a as bottom 3 of container 5 and then passes through the product contained in the filter container 5 making the infusion. The infusion liquid exits container 5 through perforations 60 in top wall 62. Due to the pressure generated in the bell element 8 inserted into the container 1, the infusion flows down wall 34 into collecting container or cup 7.

A unique feature, as shown in FIG. 9, for the invention is constituted by the interposition of a disk-shaped element having a pre-established mechanical strength to be broken under the pressure developed by heating the water.

Turning now to FIGS. 9A and 9B, the filter container 5 is cylindrical and has a horizontal peripheral flange 21 with outer edge 42 which is secured the outer edge 46 of wall 44 of container 7 and is secured to the outer edge 38 of element 2 by the bent over edge 36 of the water container 1. The second filtering disk-shaped element 4 has been eliminated. The sealing disk element 2, having a pre-established mechanical strength, is supported by the flange 21. The sealing disk 2 is either coupled by the peripheral edge 36 of the water container 1 to flange 21 (as represented in FIGS. 9A and 9B) or is thermally welded or laminated to the bottom of the flange 21. The product for the infusion is confined into the container 5 between two filter-paper disks, with the upper disk 18 and the lower disk 18a that assure that no product is wasted. The cover 67, provided with a flap 67a, is an easy-open sealing disk and is thermally welded or adhesively bonded onto the perforated top of the filter container 5.

A space 23 is provided between the perforated bottom 3 of the filter container 5 and the sealing disk 2. The perforated bottom 3 of the filter container 5 is preferably provided with at least one sharp pointed prominence or protuberance 19. The function of such a prominence is that of causing the breaking of the sealing disk 2 of pre-establishing mechanical strength when this latter, under the water pressure generated by heating the liquid for the infusion, gets deformed and is pressed upwardly by this liquid against this sharp prominence, as shown in dotted line 2a.

The advantage deriving from this sharp prominence is that, under the same conditions, it is possible to use sealing disks having a greater thickness. This avoids any risk of leakage of water through the possible porosity of the material of the sealing disk which can be expected when the thickness of the disk is very thin (sufficiently thin to be broken even under low pressures when low temperature for the infusion is required). The function of the sealing disk-shaped element 2, having a pre-established mechanical strength, is both to keep the water safely confined and to determine the temperature of the liquid for the infusion as a function of the pressure at which the material of the sealing disk is ruptured. This pressure depends upon the predetermined mechanical strength of the same disk, i.e., its thickness and type of aluminum alloy used. The temperature of the liquid for the infusion, and therefore, the temperature at which the infusion takes place, largely affects the quality, the characteristics and the type of the infusion to be obtained.

In an alternative embodiment, the bell-shaped element 8 is not sealed or force fitted against the bottom of the water container 1, but is free to move into the container. The water, as well as any other liquid for the infusion, is kept confined within the container 1 solely by the sealing disk 2. The function of the bell-shaped element is to define an annular hollow space 8a with the wall 48 of the container 1, in order to enable the water to flow upwards through said hollow space with a pressure which is the same throughout the circular surface, in order to make it possible that the product will be evenly dissolved, without preferential flow paths being created through the product.

Small protrusions 16, e.g., in a number of three at a mutual distance of 120° apart, are provided onto the external surface of the bottom 54 of the bell-shaped element facing the bottom of the flange 21 of the filter container 5. The function of these protrusions is to keep the bell element 8 apart from the flange 21 and the surface of the sealing disk 2, preventing the bottom 54 from remaining in contact with the sealing disk, and obstructing the flow of the water. Cup 7 may be made of plastic, or of metal, such as aluminum.

The container or cup 7 for the infusion according to the embodiment of FIG. 9B, is anchored to the cylindrical wall 70 of the product container 5. The cup 7, has outer vertical wall 44 and inner vertical wall 72 connected by horizontal wall 74. Inner wall 72 has detent 76 which is elastically forced against and into a circumferential groove 20, which is provided onto the cylindrical wall 70 of the filter container 5. The advantage of this embodiment is that the infusion is kept separate and apart by distance D from the flange 21, thus avoiding having the hot liquid rise from the container 1, supplying heat through the flange 21, to wall 74, to the infusion already collected into the cup 7. As is known, this heat transfer must be avoided with particular types of infusions, e.g., tea.

On the contrary, the embodiment of FIG. 9A is preferred when the type of infusion requires that this infusion be kept warmer, e.g., coffee, during its preparation. The vertical ribs, element 12, can be used in FIGS. 9, 9A, or 9B. Walls 34, 44, 48, 56, 70, 72 and 74 are imperforate, while walls 3 and 62 are perforated. While wall 34 is conical or trapezoidal, walls 44, 48, 56, 70 and 72 are cylindrical in shape.

All of the specific elements, features, means or structure shown in any one figure of the drawings can be utilized in any of the other figures of the drawings. This is because the specific embodiments shown in the drawings are merely representative of the single dose espresso maker of the present invention. The present invention is not to be limited to any specific embodiment or figure illustrated in the drawings; and therefore, structure present in one embodiment, or in one figure of the drawings, may be used with any other embodiment or figure of the drawings.

In FIGS. from 10 to 15 a further different arrangement of the elements which constitute the cartridge according to the present invention is displayed.

According to this form of practical embodiment of the present invention, the cylindrical container 1 for water is coaxially inserted inside a larger container 2; both of said containers are given a slight conical shape and are positioned upside-down; the product from which the infusion has to be produced is contained inside the chamber A between the blind bottom of the container 1 and the perforated bottom wall 2a of the container 2, which constitutes the outlet filter for the infusion.

The container 1 is destined to contain water and is tightly sealed by means of a disk 10 made from a metal material, or from any other suitable materials, connected, under tightly sealing conditions, with both the coaxial containers 1 and 2 by grafting its peripheral edge 10a around the peripheral edges 1a, 2a of both containers 1, 2, in the same way as in the practical embodiments depicted in the preceding figures.

The disk-shaped, tight-sealing element 10 has, besides its edge 10a prearranged for being bent around the edges of the containers, an additional ring-shaped hollow 11 (FIGS. 10-11), performing the task of stiffening the cover-bottom of the container of water, as well as of creating a better surface of contact with the heating plate (not shown in the figures) which will supply heat, as well as of constituting a small reserve container for water, in order to prevent the sealing disk 10 and the container 1 from being immediately dried.

Inside the container 2 of the infusion product (FIG. 13) three or more longitudinal, equidistant ribs 12 are relieved in order to keep the container 1 trued and with possibility of shifting upwards (as we'll see in the following), generating between said containers 1 and 2 an annular hollow space 13 capable of enabling water to rise up in order to enter the A region between the coaxial containers.

The tight sealing between the base disk 10 and the edge of the mouth of water container 1 can be accomplished by either of two way, equally efficacious in order to enable the container 1 to get detached from the disk 10 and to move upwards under the thrust exerted by water pressure during the cartridge heating.

The first way consists in providing along the peripheral edge 1a (FIG. 12) of the container 1, in case said container 1 is made from a plastic material, two reductions in thickness: the first reduction in thickness concerns the "Z" regions which, in the practical embodiment shown in FIGS. 10 and 12, are four, but which can also be three regions at a mutual distance of 120°, or even more than 4, all at a same mutual distance; they have the shape of an elongated oval arc; the second reduction in thickness concerns the "Z" regions (FIG. 11), which are interposed between the "Z" regions, and therefore are in a same number as them.

Said reductions in thickness are provided for a purpose which is explained in the following disclosure of how the device operates.

By having available a heat source, the espresso maker according to FIG. 10, but complete with the infusion collecting container 14 (see FIG. 15) (wherein this container can be either of a plastic materal—either with or without a handle—also of disposable character, or of metal—with a handle—to be used again), water is heated and generates water vapour. This latter cannot escape from the container 1 and generates a certain pressure inside it. When said pressure reaches a certain value (0.4-0.5 bar), the reductions in thickness provided at the "Z" regions enable the container 1 to move upwards for a few tenths of a millimeter, with water applying a pressure to the reductions in thickness at the "Z" regions. Inasmuch as such redutions in thickness are considerable, and the walls are hence very thin, under the thrust applied by the constantly increasing water vapour pressure ruptures will be produced, through which water can pass, rise along the hollow space 13 between the containers 1 and 2 (which hollow space cannot be eliminated owing to the presence of the protrusions 12) and reach the ground coffee contained inside the "A" chamber in order to flow through it, extracting the flavours contained in it, and then be collected inside the container 14 (FIG. 15).

The correct operation of the espresso maker accomplished as disclosed by referring to the FIGS. from 10 to 15 depends, above all, on the following structural and dimensional factors, i.e.:

on the correct ratio of the surface area of the disk 10 to the surface area of the heat source (electrical mini plate);
on the type of plastic material used for both containers, and possibly also for the collection container 14; and on the correct dimensioning of the thicknesses and of the surface areas at the edge 1a of the container 1.

In that regard, we stress that the lifting of even just 2 tenths of a millimeter of the container 1 from the disk 10 is sufficient for water passage, in that such an opening approximately corresponds to the opening of a tube of 6 mm of diameter.

If, on the contrary, the container 1 is made from metal, inasmuch as in that case the differences in thickness would be difficult, and maybe even impossible, to accomplish, first of all a small "lifting" thereof will have to be rendered possible by adopting a very thin thickness for the same container, and furthermore in order to cause the ruptures to take place, which are necessary for water passage, cuts—as deep as possible—will be produced along most perimeter of "Z" regions. Such cuts, under the thrust applied by the pressure will yield, and water will be enabled to flow through the cracks which will be formed.

FIG. 14 shows a further form of practical embodiment of the container 1 and of the disk 10. The container 1 (whether of metal or of plastic material) is literally "stoppered" by a circular protrusion 10b provided on the disk 10, so that only an inner pressure of about 0.4–0.5 bar (corresponding, owing to the concerned surface area, to a total thrust of about 10 kg), succeeds in detaching the container 1 from the disk 10 and in pushing it upwards, in order to cause water to pass and (advantageously) "compress" ground coffee.

FIG. 16 shows finally a form of practical embodiment totally made from a metal material, easily understandable after the preceding disclosure.

The container 1, which contains water, is tightly sealed by the circular protrusion "D" provided a the bottom of the container 2, which "grafts" at "A" the filter 15, under which ground coffee is enclosed. The container 14a (a separate piece which, as already said, can be either made from a metal—in this case, it being re-useable—or from a plastic material, in this case it being of use-and-throw-away type), "matches" the short conical portion "C" of the container 2, creating the tight sealing for beverage collection.

Both circular "B" edges—which lap each other—provided on both containers are necessary in order to prevent ground coffee from occupying the circumferential hollow space 13b existing between said containers. When the container 1 will move upwards, opening the tight seal "D", the rib "B" on the same container will be lifted, generating the necessary opening for water to pass.

From the above, it is clear that when the finding according to the present invention is practiced, it may be supplied with further variants and modifications of both structural and functional character, concerning both the geometrical shape and the dimensions thereof, without departing from the scope of protection of the same finding.

I claim:

1. A single-dose expresso maker for producing infusions and useable once only comprising:
   a first container provided with perforated top and bottom, containing a dose of product from which the infusion is to be made, said first container bottom having a peripheral edge;
   a second container having a closed bottom and an open top, connected by a wall, said open top having a peripheral edge, positioned under said first container, containing the water to be heated in order to prepare the infusion, the open top of the second container being coupled to and tightly sealed with the bottom of said first container along the peripheral edge of each container;
   a first sealing disk-shaped element having a pre-established mechanical strength and having a peripheral edge;
   a second filtering disk-shaped element having a peripheral edge and provided with one or more holes, said first and second disk elements being interposed and tightly sealed along their peripheral edges between said first and second containers, in order to keep the water confined and separated from the product and to enable, after the water container is heated, the pressure developed by the heated water to break said first disk-shaped sealing element, making it possible for the water to flow through said dose of product, and hence producing the infusion;
   a bell-shaped element having an open top and a closed bottom connected by a wall and coaxially housed inverted inside said second container and defining an annular hollow space between the bell-shaped element wall and the wall of said second container, with said bell-shaped element being suitable for being liftable and raised under the thrust applied by the heated water in order to enable said water to flow upwards thorugh said hollow space;
   at least three small protrusions, spaced apart at a mutual disance of 120°, being provided onto the bottom of said bell-shaped element, so enabling the water to flow even while the bell element is raised; and
   a third container, coaxially anchored to said first container, and suitable to collect the infusion produced and expelled from said first container.

2. An expresso maker according to claim 1, wherein said first and second containers are provided with a protruding peripheral edge, with one of said peripheral edges being so dimensioned as to be capable of being bent around the edge of said first sealing disk-shaped element and of said second filtering disk element, in order to tightly seal the container of the water separately from the container of the product from which the infusion is to be made.

3. An espresso maker according to claim 1,
   further comprising vertical ribs on the inner surface of said second container; an
   wherein said bell-shaped element is mounted coaxially guided inside said second water container by said vertical ribs provided on the inner surface of said second container.

4. An expresso maker according to claim 1,
   further comprising ring-shaped reliefs or grooves on the bottom of the water container; and
   wherein said liftable bell-shaped element is anchored to the bottom of the water container by means of a forcing of its open top against said ring-shaped reliefs or grooves provided on the same bottom of the water container, with an unlocking of the bell element being caused by the pressure generated by heated water.

* * * * *